United States Patent
Matson

(10) Patent No.: US 7,444,792 B2
(45) Date of Patent: Nov. 4, 2008

(54) H CLIP

(75) Inventor: John R. Matson, Stoughton, WI (US)

(73) Assignee: M&O Products, Inc., Portage, WI (US)

( * ) Notice: Subject to any disclaimer, the term of this patent is extended or adjusted under 35 U.S.C. 154(b) by 325 days.

(21) Appl. No.: 11/345,510

(22) Filed: Feb. 1, 2006

(65) Prior Publication Data

US 2006/0174579 A1    Aug. 10, 2006

Related U.S. Application Data

(60) Provisional application No. 60/651,745, filed on Feb. 10, 2005.

(51) Int. Cl.
*E04C 5/00*    (2006.01)

(52) U.S. Cl. .................. 52/698; 52/285.3; 52/582.1; 24/336; 24/555

(58) Field of Classification Search ............ 52/696, 52/468, 470, 582.2; 24/336, 458, 581.11, 24/297, 555; 16/225; 403/326, 329, 305, 403/309; 446/108, 109, 111, 112, 113, 114, 446/115, 124

See application file for complete search history.

(56) References Cited

U.S. PATENT DOCUMENTS

| | | | |
|---|---|---|---|
| 4,318,261 A | | 3/1982 | Smith |
| 4,602,468 A | | 7/1986 | Simpson |
| 4,703,603 A | | 11/1987 | Hills et al. |
| 5,079,889 A | | 1/1992 | Wright |
| 5,487,690 A | * | 1/1996 | Stoffle et al. ............ 446/105 |
| 5,520,477 A | * | 5/1996 | Fink ........................ 403/397 |
| 5,885,024 A | | 3/1999 | Zupan et al. |
| 6,186,698 B1 | | 2/2001 | Knapp |

FOREIGN PATENT DOCUMENTS

DE    199 04 432 A1    8/2000

\* cited by examiner

*Primary Examiner*—Richard E. Chilcot, Jr.
*Assistant Examiner*—Anthony Gennaro, Jr.
(74) *Attorney, Agent, or Firm*—Charles S. Sara, Esq.; DeWitt Ross & Stevens, S.C.

(57) ABSTRACT

An H-shaped clip is used to connect two pieces of building material such as plywood, roofing sheath, wafer board or other materials quickly, easily and securely. The H clip includes two tapered arms connected by a spacing bar, where each arm ends in a ski-shaped lead-in having a contoured face and a living hinge.

13 Claims, 2 Drawing Sheets

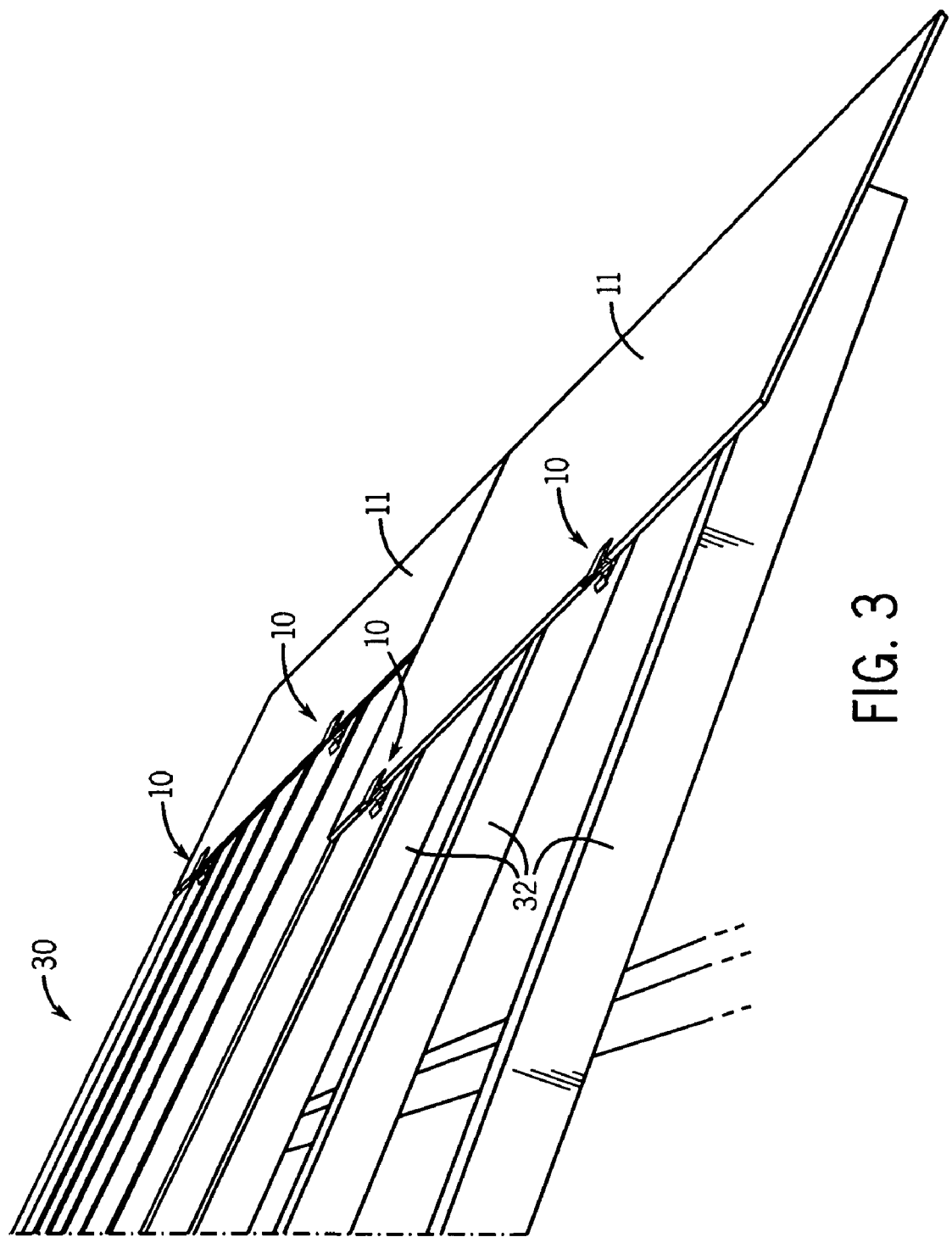

H CLIP

This utility patent application claims the benefit of Provisional Application No. U.S. 60/651,745 filed Feb. 10, 2005.

FIELD OF THE INVENTION

The present invention is directed to a clip for use in the construction industry and particularly to an H-shaped clip for spacing and installing building materials such as roof sheathing.

BACKGROUND OF THE INVENTION

In order for certain panel grades to be used at maximum support spacing, most building codes require that the edge of the panels be supported either by wood blocking, tongue and groove edges or panel clips. The construction and building industries use panel clips to fulfill this requirement. The clips are typically used to secure pieces of plywood or other sheets of wood together. Conventional clips are small, usually metal or galvanized clips formed in the shape of an "H" that fit between the joints of two pieces of building material, such as plywood or wafer board sheets, to stiffen the joint. Typically, H-shaped clips, hereafter referred to as "H clips" or simply "clips," are used to secure roofing materials together so as to allow the materials to expand and contract in a uniform manner.

Conventional H clips do not have provisions that allow the clips to adjust to materials of different thickness. Thus, conventional H clips may be too tight or too loose for the given building material, and can often fall off the material. Further, conventional H clips can be difficult to install. Therefore, a need exists for an H clip that can adjust to fit between building materials of varying thicknesses, as well as an H clip that is easy to install and remains securely in position.

SUMMARY OF THE INVENTION

The invention is an H-shaped clip used to connect two pieces of building material such as plywood, roofing sheath, wafer board or other materials quickly, securely and easily.

The H clip includes two opposed arms connected by a spacer bar, where each arm ends in a ski-shaped lead-in having a contoured face and a living hinge. The contoured face and living hinge provide the necessary flexibility to allow each ski-shaped lead-in to be quickly and easily inserted onto a piece of building material. Further, when the H clip is inserted between the materials, the contoured face of the lead-in helps to keep the H clip lying flat on the materials. Because the lead-in, living hinge, and tapered arms all work to grip the material, thereby keeping the H clip secured in position on the material, a second sheet of building material can be easily inserted into one or more of the H clips and easily slid sideways into its final position. The tapered arms allow the H clip to be used with materials of a variety of thicknesses.

In a preferred version, the H clip is made of a flexible material such as nylon, plastic or other polymeric compound that can adjust to a specified range of material thickness. Further, the H clip can be pre-loaded onto building materials and will stay in place. The H clip also provides better spacing between the building materials for expansion.

The H clip of the present invention has the advantages of fast and easy installation. In addition, the clip can be pre-loaded onto a sheet of building material and will stay in place. The H clips of the present invention allow for a consistent spacing, typically ⅛ inch space between the building material sheets.

The scope of the invention will appear more fully from the following detailed description of the preferred embodiment of the invention made in conjunction with the accompanying drawings.

BRIEF DESCRIPTION OF THE DRAWINGS

FIG. 3 is perspective view of a building roof undergoing construction and showing the use of the clip of the present invention.

DETAILED DESCRIPTION OF THE INVENTION

Figure 1:
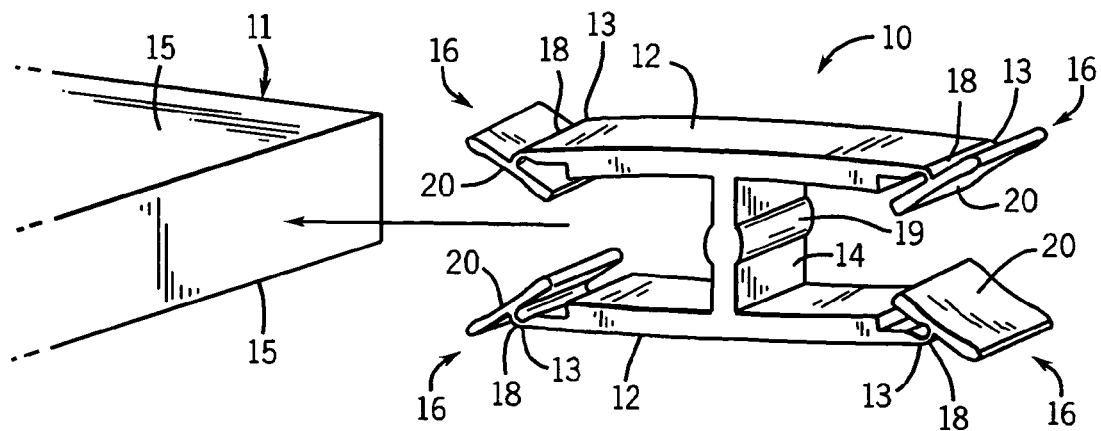
FIG. 1 is a perspective view of the clip of the present invention.
Figure 2:
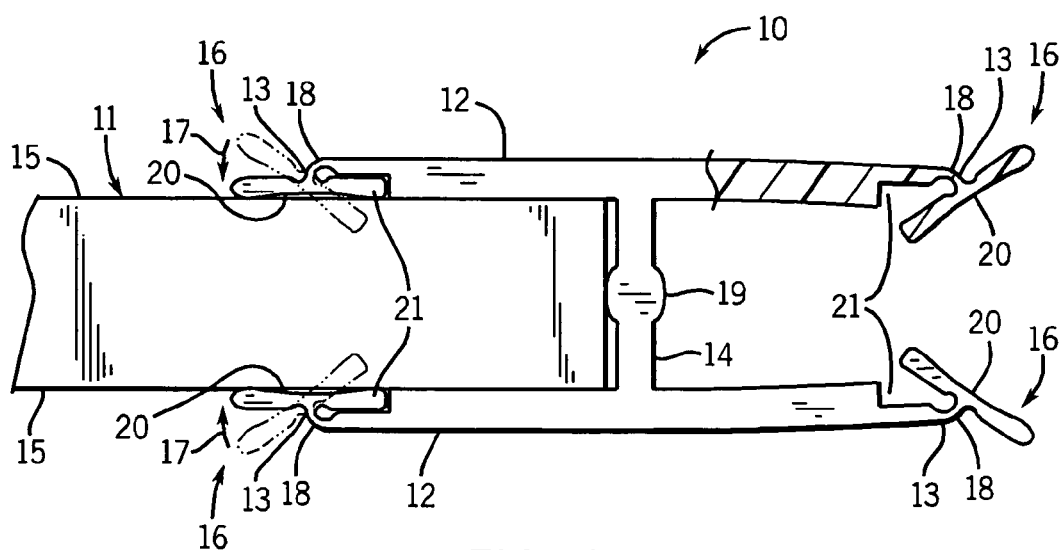
FIG. 2 is side-elevated view of the clip of FIG. 1 attached to a board.

Referring now to FIGS. 1 and 2, the H clip 10 of the present invention is illustrated. The H clip 10 is used to connect two sheets of building material 11. The H clip 10 can be installed on a variety of building materials 11, such as plywood, roofing sheath, wafer board or other materials, quickly, easily and securely.

The H clip 10 is generally a one-piece unit which includes a pair of identical and opposed arms 12 in a modified parallel position to each other and connected by a spacing bar 14. Each arm 12 includes identical first and second ends 13. Preferably, the arms 12 are slightly tapered such that the distance between the arms 12 at ends 13 is closer than the distance between the arms 12 at the spacing bar 14. Therefore, the ends 13 of the arms 12 exhibit some resistance to a complete parallel relationship between the arms 12. In this manner, the tapered arms 12 allow the H clip 10 to be used with materials 11 of a variety of thicknesses.

The spacing bar 14 can be of a variety of thicknesses. Preferably, it is at least ⅛ inch thick to ensure a ⅛ inch expansion gap between the aligned building materials 11. As illustrated, the spacing bar 14 can also include a thickened area 19 to assist in air circulation between the sheets of building material 11.

The first and second ends 13 of each arm 12 include a ski-shaped splayed prong or lead-in 16 connected to the end 13 by a living hinge 18. By the term "living hinge," the present invention intends that the lead-in 16 is still part of the one-piece construction making up the H clip 10. However, the living hinge 18 is thinner, giving the hinge 18 some rotating flexibility and illustrated by reference number 17 in FIG. 2. Other types of hinges, such as separate "piano-style" hinges, are also contemplated although not illustrated in the figures.

The lead-in 16 includes a face 20 which is preferably contoured as illustrated. The contoured face 20 and living hinge 18 provide the necessary flexibility to allow each lead-in 16 to be quickly and easily inserted onto opposing surfaces 15 of a sheet of building material 11. Further, when the H clip 10 is inserted on the materials 11, as illustrated in FIG. 2, the contoured face 20 of the lead-in 16 rotates on the hinge 18, as illustrated by reference number 17 in FIG. 2. The lead-in 16 eventually rotates such that it comes to rest within an indentation 21 on each end 13 of the arms 12 in a position parallel the surfaces 15 of the building material 11. In this manner, the entire arm 12 of the H clip 10 is flattened along the surfaces 15 of the building materials 11. Therefore, the lead-in 16 make it easier to fit the H clips 10 onto the building material 11 and grip the material 11 firmly once in place.

The H clip 10 can be of various widths, lengths and sizes, depending on the needs of the installer. Because of the taper in the arms 12, the H clip 10 can conveniently accommodate building material 11 sheets of a variety of thicknesses. For example, the typical H clip 10 designed for building material sheets of ±2 inch thickness can also accommodate sheets of 7/16 inch thickness.

The H clip 10 can be made of sheet metal, plastic, polymeric compounds or any other material providing the necessary flexibility. In a preferred version, the H clip 10 is made of a flexible material such as nylon, plastic or other polymeric compound that can adjust to a specified range of thickness of the various building materials 11.

Because the lead-in 16, living hinge 18, and tapered arms 12 all work to grip the building material 11, thereby keeping the H clip 10 secured in position on the material 11, a second sheet of building material 11 can be easily inserted into one or more of the H clips 10 and easily slid sideways into its final position.

Referring now to FIG. 3, the H clip 10 is shown in use in a typical construction sight, i.e., on a roof 30 currently under construction and showing a plurality of rafters 32 on which the sheets of building material 11 are placed. In use, a plurality of H clips 10 may be installed as needed during construction, or the H clips 10 may be pre-loaded onto a first piece of building material 11, as shown in FIG. 3, and secured in position while a second piece of building material 11, not shown, is inserted into the opposing end of the H clip 10. Due to the quick and easy use of the H clip 10, it can be used for spacing and installing sheets of building material 11 in the construction industry, as well as the temporary alignment and spacing for any type of building material 11. Further, the H clip 11 helps to reduce the amount of clips wasted or lost due to falling off the material. This also reduces the time spent clearing construction sites of debris.

In use, an installer grips the H clip 10 on the arms 12 with the fingers of one hand. By angling the ski-shaped lead-ins 16 located on one end 13 of the tapered arms 12 onto the edge of a piece of building material 11, the lead-ins 16 can be quickly and easily inserted onto the material as illustrated in FIG. 2. When the lead-ins 16 on one end of the H clip 10 are secured in the proper position on the material 11, the installer can insert a second sheet of material between the lead-ins 16 on the opposing ends 13 of the tapered arms 12. In this manner, multiple pieces of material 11 are connected together to form a roof or other structure.

The ski-shape of the lead-ins 16 combines with the living hinges 18 and contoured face 20 to provide a spring-loaded, angled surface providing the necessary flexibility for the H clip 10 to be quickly and easily inserted onto the edge of a piece of building material 11. The living hinges 18 act to spring-load the lead-ins 16 by providing a hinged surface that flexes away from the material 11 as the H clip 10 is being inserted and then springs towards the material 11 as the H clip 10 is fully inserted onto the material 11. The living hinges 18 also provide the lead-ins 16 the necessary flexibility to be quickly and easily inserted onto the edge of a piece of building material 11. In addition, once the lead-in 16 is inserted onto the edge of the material 11, the living hinges 18 help to properly grip the material 11, thereby securing the H clip 10 onto the material 11.

Once the lead-in 16 is inserted onto the edge of the material 11, the contoured face 20 provides a smooth, contoured surface for the material 11 to slide over as the H clip 10 is completely inserted. Further, the contoured face 20 of the lead-ins 16 causes the lead-ins 16 to lay in a flattened position when installed.

Once the H clip 10 is properly inserted between two pieces of building material 11, the tapered arms 12 help to grip the building material 11, keeping the H clip 10 securely in position. Further, the tapered arms 12 provide a necessary degree of flexion for use in applications where materials 11 of different thicknesses are used.

Regardless of the thickness of the material being held together, when the H clip 10 is inserted between two pieces of material 11, the spacing bar 14 automatically provides the proper amount of expansion gap between the pieces of material 11. In a preferred version, a spacing of one-eighth inch is provided. This provides uniformity to the surface or structure being constructed, and frees the installer from having to estimate the proper expansion gap between each piece of building material 11.

It is understood that the invention is not confined to the particular construction and arrangement of parts herein illustrated and described, but embraces such modified forms thereof as come within the scope of the following claims.

I claim:

1. A one-piece panel clip for use in construction, comprising a spacing bar centrally and perpendicularly disposed between a pair of spaced apart arms, wherein the arms are generally in parallel disposition with each other, wherein each arm has a first end and a second end, wherein the ends of each arm comprise a lead-in rotatably mounted to the arm, wherein the ends of the arms include indentations to accommodate the rotation of the lead-in thereby allowing the lead-ins to rotate inwardly to a parallel configuration with respect to the arms.

2. The clip of claim 1 wherein the lead-ins include a contoured face.

3. The clip of claim 1 wherein the arms are tapered such that the opposing ends of the arms are closer to each other than arms at the location of the spacing bar.

4. The clip of claim 1 wherein the spacing bar includes a thickened area.

5. The clip of claim 1 wherein the end of each arm further comprises a flexible living hinge connecting the lead-in to the arm.

6. The clip of claim 1 wherein the clip is made of materials selected from the group consisting of metal, nylon, plastic or other polymeric compound.

7. The clip of claim 1 wherein the clip is made of a polymeric compound.

8. A one-piece panel clip for use in construction, comprising a spacing bar centrally and perpendicularly disposed between a pair of spaced apart arms,
   wherein the arms are generally in parallel disposition with each other, wherein each arm has a first end and a second end,
   wherein the ends of the arms include indentations to accommodate the rotation of a lead-in thereby allowing the lead-ins to rotate inwardly to a parallel configuration with respect to the arms,
   wherein the arms are tapered such that the opposing ends of the arms are closer to each other than arms at the location of the spacing bar,
   wherein the ends of each arm comprise the lead-in rotatably mounted to the arm.

9. The clip of claim 8 wherein the lead-ins include a contoured face.

10. The clip of claim 8 wherein the spacing bar includes a thickened area.

11. The clip of claim 8 wherein the end of each arm further comprises a flexible living hinge connecting the lead-in to the arm.

12. The clip of claim 8 wherein the clip is made of materials selected from the group consisting of metal, nylon, plastic or other polymeric compound.

13. The clip of claim 8 wherein the clip is made of a polymeric compound.

* * * * *